Aug. 11, 1953 — C. W. KIKER, JR — 2,648,087
WINDSHIELD WIPER
Filed Feb. 29, 1952 — 2 Sheets-Sheet 1
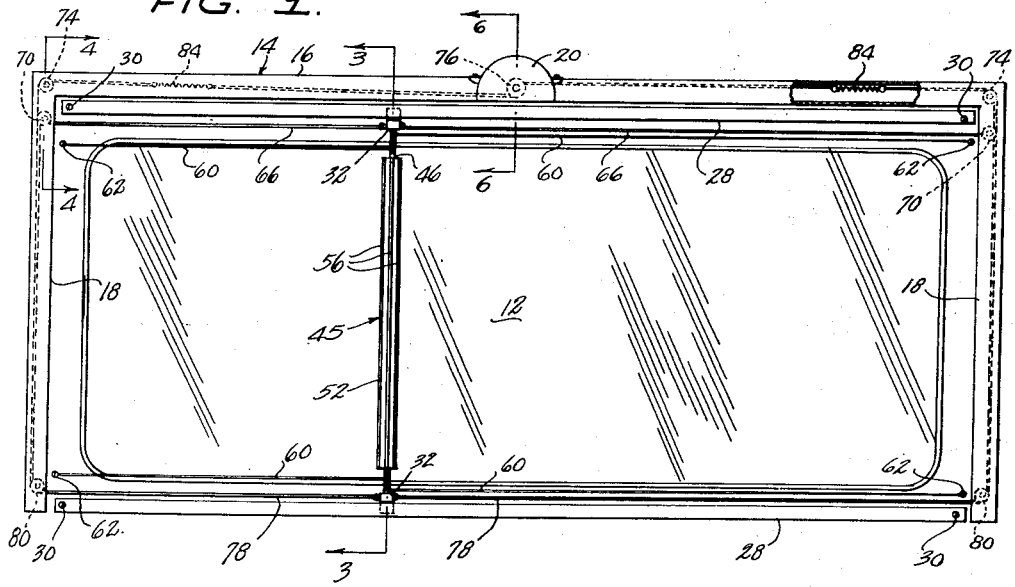
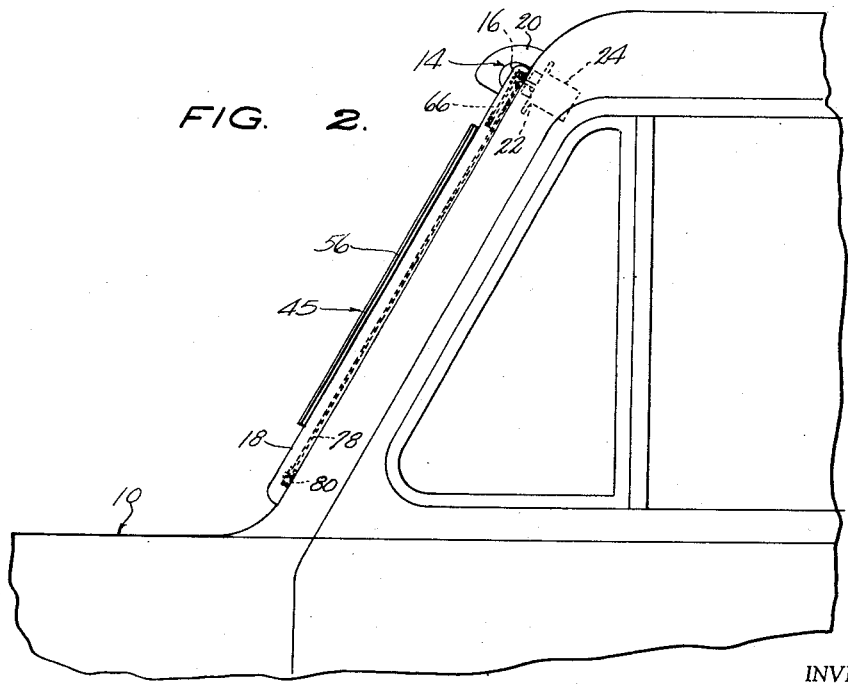
INVENTOR
CHARLES W. KIKER, JR.
BY
ATTORNEYS Aug. 11, 1953
C. W. KIKER, JR
2,648,087
WINDSHIELD WIPER
Filed Feb. 29, 1952
2 Sheets—Sheet 2
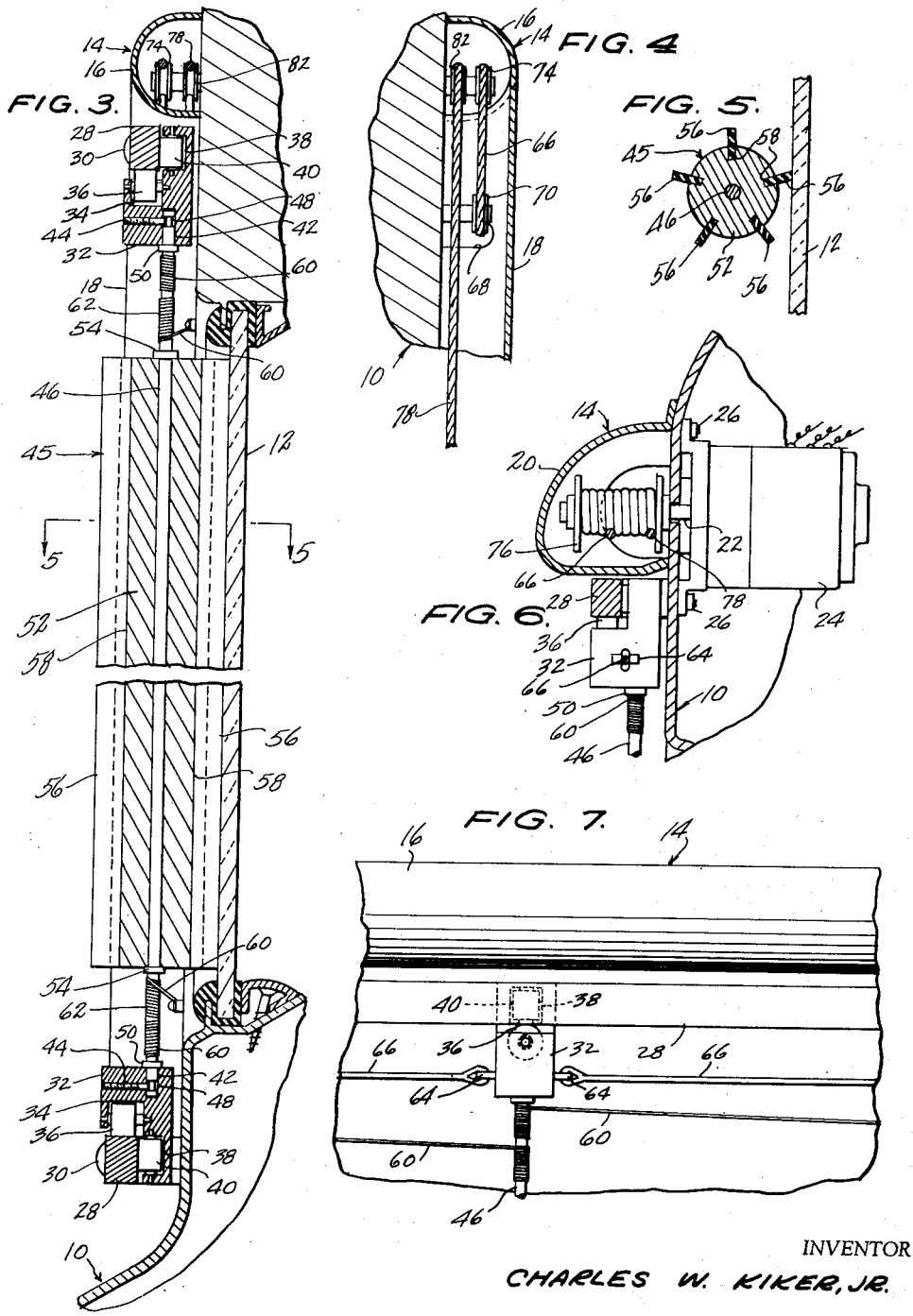
INVENTOR
CHARLES W. KIKER, JR.
BY
McMorrow, Berman & Davidson
ATTORNEYS Patented Aug. 11, 1953

2,648,087

UNITED STATES PATENT OFFICE 2,648,087

WINDSHIELD WIPER

Charles W. Kiker, Jr., Blue Ridge, Ga.

Application February 29, 1952, Serial No. 274,122

3 Claims. (Cl. 15—254)

This invention relates to windshield wipers for vehicles. More particularly, the invention has reference to a windshield wiper adapted to be reciprocated bodily over the surface of a vehicle windshield, while being simultaneously rotated to clean the windshield of rain, road film, and the like.

Conventional automobile windshield wipers have certain disadvantages, and notable among these is the arrangement wherein the wiper action extends over too small a portion of the window area. Additionally, it is well recognized among operators of trucks, automobiles, and similar vehicles, that the wiping action of conventional wipers tends to deteriorate after a period of time, as a result of which the windshield is not cleaned by the wiper with the desired amount of efficiency.

Still further, the conventionally constructed, swingable windshield wiper has been found to have an action that in many instances, attracts the eye of the operator of the vehicle, to such an extent as will cause the vehicle operator to concentrate on road and driving conditions to a lesser degree than is desirable.

In view of the above, it is proposed to provide a windshield wiper for vehicles so designed as to have none of the deficiencies noted above, the windshield wiper constructed in accordance with the present invention being so designed as to cause the wiper action to cover more than 90% of the window area, while at the same time cleaning the windshield surface with greater efficiency than has heretofore been the case. The construction of the present invention, additionally, is intended to interfere with the vision of the vehicle operator to a lesser extent than is true of conventionally constructed, pivotally mounted wipers.

Another important object is to provide, in a windshield wiper as stated, a formation and relative arrangement of parts which is such as to cause a surface-engaging roller to be reciprocated bodily over the windshield, along a path transverse of said roller, while effecting the rotation of the roller in a direction adapted to wipe the windshield surface oppositely to the direction in which the roller is being bodily shifted, thereby to obtain an improved wiping action.

Yet another important object is to provide a windshield wiper as stated which will be mountable upon vehicles already in use, with a minimum amount of difficulty.

Other objects will appear from the following description, the claims appended thereto, and from the annexed drawing, in which like reference characters designate like parts throughout the several views, and wherein:

Figure 1 is a front elevational view of a windshield wiper formed in accordance with the present invention, a portion of the wiper frame being broken away to show details of inner construction;

Figure 2 is a side elevational view, a vehicle on which the wiper is mounted being illustrated fragmentarily;

Figure 3 is an enlarged sectional view taken substantially on line 3—3 of Figure 1, portions being broken away;

Figure 4 is an enlarged detail sectional view taken substantially on line 4—4 of Figure 1;

Figure 5 is a transverse sectional view through the wiping member embodied in the invention, taken on line 5—5 of Figure 3;

Figure 6 is an enlarged detail sectional view taken on line 6—6 of Figure 1; and Figure 7 is an enlarged front elevational view showing a portion of the frame and the mounting of the wiping member, said frame and wiping member being illustrated fragmentarily.

In the drawings, there has been illustrated fragmentarily a conventional vehicle, designated generally by the reference numeral 10. The vehicle is equipped with the usual windshield 12.

The windshield wiper formed in accordance with the present invention includes a frame 14, said frame being of tubular formation throughout, and being of inverted U shape in the preferred embodiment of the invention. Thus, as seen from Figure 1, the frame extends about three sides of the windshield 12, and is provided with a horizontally disposed top portion 16 extending longitudinally of the windshield contiguous to the upper edge thereof, the frame also including depending side portions 18 rigid with and communicating at their upper ends with the opposite ends of the top portion. The side portions 18, as seen from Figure 1, extend along the opposite side edges of the windshield 12.

Medially between its opposite ends, the top portion 16 is formed with an enlarged motor shaft housing 20, into which extends the shaft 22 of a reversing motor 24 mounted upon the body of the vehicle 10 by means of bolts 26 or the like (Figure 6).

I provide a pair of guide bars 28, said bars being of straight, elongated formation and extending along opposite edges of the windshield 12. At their opposite ends, the guide bars 28 are anchored to the vehicle body by means of screws 30 or equivalent fastening means.

Mounted upon the respective guide bars 28, for movement longitudinally of the guide bars, are support blocks 32, the construction of which is best illustrated in Figures 3, 6 and 7. When viewed in cross-section, the blocks 32 are of L-shaped formation, this construction being preferred so as to define, in each block, a recess receiving the guide bar 28 associated therewith.

As will be noted from Figure 3, the blocks 32 are identical in formation, but oppositely arranged. Accordingly, the construction of only one of the blocks will be described, it being understood that the other block will be formed identically to the described block, but inverted when incorporated in the completed assembly.

The guide block 32 is formed with a recess 34 in which is rotatably mounted a guide wheel 36, said wheel having rollable contact with one side surface of the guide bar associated therewith. The block 32 is also formed with a second recess 38, in which a second guide wheel 40 is rotatably mounted, the guide wheel 40 having rollable contact with another side surface of the guide bar 28 contiguous to the first-named side surface.

Formed in the guide block is a socket or journal 42, and a set screw 44 is threadable through the guide block to an extent sufficient to cause the inner end of the set screw to project a short distance into said socket or journal.

The invention includes a wiping member designated generally by the reference numeral 45, said member including a shaft, a roller rigid with the shaft, and a plurality of wiping blades carried by the roller.

The shaft of the wiping member has been designated by the reference numeral 46, and has its opposite ends journaled rotatably in the respective blocks 32.

As will be noted from Figure 3, the journaled ends of the wiping member shaft 46 are formed with circumferential grooves 48, into which the inner ends of the set screws 44 extend. The set screws, in this connection, do not extend into engagement with the ends of the shaft 46, and are intended merely to prevent accidental movement of the shaft out of its associated blocks 32.

Cooperating with the set screws 44 and grooves 48 in preventing endwise movement of the wiping member shaft 46 are stop collars 50, contacting the adjacent surfaces of the blocks 32.

Rigidly secured in any suitable manner to the intermediate portion of the wiping member shaft 46 is a cylindrical roller 52, so proportioned as to length as to extend almost fully from top to bottom of the windshield (Figure 1). The roller 52 can be formed of any suitable material, and is provided with a circumferential series of wiping blades 56, said blades being of soft rubber or other material found effective for cleaning a windshield surface, and being embedded in a circumferential series of longitudinal recesses 58, that are formed in the surface of the roller 52. The blades 56, as will be noted from Figures 1 and 3, extend throughout the full length of the roller 52.

To prevent endwise movement of the roller 52 relative to the shaft 46, collars 54 can be provided upon the shaft, engaging opposite ends of the roller.

By reason of the construction which has so far been described, it is seen that the wiping member 45 is mounted for reciprocating movement from side to side of the windshield 12 along a path transverse of said wiping member, said wiping member being adapted for rotation during said movement.

For the purpose of imparting rotational movement to the wiping member during its reciprocation over the windshield surface 12, I provide a cord 60 or like flexible element, at each end of the shaft 46. Each of the cords 60 has its medial portion wound tightly about its associated end of the shaft 46, the end portions of the cord extending in opposite directions from the shaft along lines paralleling the path of reciprocating movement of the wiping member, and being anchored to lugs 62 mounted upon the vehicle body adjacent the opposite sides of the windshield.

Thus, it will be seen that if the wiping member 45 is shifted bodily across the windshield surface in one direction, as for example, to the right in Figure 1, it will be rotated during its movement. Subsequently, when the wiping member is shifted in an opposite direction, it will be oppositely rotated.

In this regard, the cords 60 are so wound upon the opposite ends of the shaft 46 as to cause the respective wiping blades 56 to wipe across the windshield surface in a direction away from the direction in which the wiping member 45 is being bodily shifted.

The invention also includes a linkage whereby the rotation of the motor shaft 22 is translated into reciprocating movement of the wiping member 45 along said path, and to this end, there is secured to opposite sides of each block 32 rings 64 (Figure 7). To the opposite rings of the upper block 32, I connect the opposite ends of an upper, motion-transmitting cable 66, said cable extending in opposite directions from the upper block along lines paralleling the path of reciprocating movement of the wiping member 45. At opposite sides of the windshield 12, the cable 66 is extended through openings 68 (Figure 4) formed in the respective side portions 18 of the frame 14.

Within the side portions 18, pulleys 70 are rotatably mounted adjacent the openings 68, the cable 66 being trained over said pulleys and being then extended upwardly for passage around upper corner pulleys 74, that are also rotatably mounted in the frame 14 at the intersection of the side portions 18 with the opposite ends of the top portion 16 of said frame.

After being trained about the pulleys 74, the cable 66 is extended toward the center of the top portion 16 and is wound about a drum 76 fixed to the motor shaft 22.

A lower cable 78 is also provided, said cable 78 having its opposite ends connected to the lower block 32 and being trained about lower corner pulleys 80, that are rotatably mounted in the lower ends of the side portions 18. The cable 78 is then extended longitudinally of and within the respective side portions, and is trained about a second set of upper corner pulleys 82. Thereafter, the cable 78 is wound about the drum 76.

By reason of this construction, rotation of the motor shaft in one direction will be effective to shift the wiping member 45 in one direction, toward one side of the windshield 12. When the wiping member is so shifted, it will be caused to rotate in the manner previously described herein, the rotative movement obtaining by reason of the provision of the cords 60.

When the wiping member 45 reaches the end of its travel in one direction, the reversing motor will act to reverse the direction of rotation of the motor shaft 22, and as a result, the wiping member 45 will now travel toward the opposite end of the windshield 12.

It is preferred that the cables 66, 78 be provided with short tension springs 84, said springs being adapted to hold said cables taut, and cushion the reversing of the movement of the cables.

It is believed that the construction illustrated and described has certain important characteristics, and among these is the arrangement wherein practically the full area of the windshield is cleaned by the wiping member, during reciprocating and rotatable movement of the wiping member thereacross. It is also believed to be of importance that the construction is one which is effective to cause a more efficient cleaning action of the windshield surface, because of the particular construction of the wiping member, and because of the rotation of the wiping member in a direction opposite that in which the wiping member is being bodily moved. Still further, it is thought to be of importance that the construction is one which does not cause the vision of the operator to be attracted to the windshield wiper, thereby permitting the operator to devote his full time and attention to road and driving conditions.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. A windshield wiper comprising: an elongated wiping member adapted to extend across the surface of a windshield and wipe the same when reciprocated over said surface; a pair of guide bars mountable adjacent opposite edges of a windshield and arranged transversely of the wiping member, the wiping member having its opposite ends mounted for rolling movement upon and longitudinally of the respective guide bars, whereby to support said wiping member for reciprocating movement along a path transverse of the wiping member, and for rotation during said movement; a power means of the reversing type adapted for mounting adjacent the windshield; a linkage extending from the wiping member to said power means, for reciprocating the wiping member across said windshield surface responsive to actuation of said means; and cords wound upon the respective ends of the wiping member and adapted to be anchored at their ends adjacent said windshield, for rotating the wiping member responsive to reciprocating movement thereof over the windshield surface.

2. A windshield wiper comprising: an elongated wiping member adapted to extend across the surface of a windshield and wipe the same when reciprocated over said surface, said member including a shaft, a cylindrical roller rigid with the shaft, and radial wiping blades on the roller; a pair of guide bars mountable adjacent opposite edges of a windshield and arranged transversely of the wiping member, said shaft having its opposite ends mounted for rolling movement upon and longitudinally of the respective guide bars, whereby to support the wiping member for reciprocating movement along a path transverse thereof, and for rotation during said movement; a power means of the reversing type adapted for mounting adjacent the windshield; a linkage extending from the wiping member to said power means, for reciprocating said member across the windshield surface responsive to actuation of said means; and cords wound upon the respective ends of the shaft and adapted to be anchored at their ends adjacent said windshield for rotating the roller responsive to reciprocating movement of the wiping member over the windshield surface.

3. A windshield wiper comprising: a frame adapted for mounting upon a vehicle body in a position to extend about a windshield of said vehicle; an elongated wiping member proportioned for extension across the surface of the windshield to wipe the same when reciprocated over said surface, said member including a shaft, a cylindrical roller rigid with the shaft, and radial wiping blades on the roller; a pair of guide bars mountable adjacent opposite edges of the windshield and arranged transversely of the wiping member, said shaft having its opposite ends mounted for rolling movement upon and longitudinally of the respective guide bars, whereby to support said member for reciprocating movement along a path transverse thereof, and for rotation during said movement; a reversing motor having a shaft extending into said frame; a drum on the motor shaft; a linkage extending from the wiping member to said motor shaft for reciprocating said member across the windshield surface responsive to actuation of the motor, said linkage including a plurality of pulleys rotatably mounted on the frame and a pair of cables trained over the pulleys, said cables respectively having their medial portions wound upon the drum and their opposite ends secured to the respective ends of the wiping member shaft; and cords wound upon the respective ends of the shaft and adapted to be anchored at their ends adjacent said windshield for rotating the roller responsive to reciprocating movement of the wiping member over the windshield surface.

CHARLES W. KIKER, JR.

References Cited in the file of this patent

UNITED STATES PATENTS

| Number | Name | Date |
|---|---|---|
| 1,035,796 | Lamb et al. | Aug. 13, 1912 |
| 1,197,763 | Plotnitzky | Sept. 12, 1916 |
| 1,208,801 | Leary | Dec. 19, 1916 |
| 1,219,977 | Martin | Mar. 20, 1917 |
| 1,251,775 | Cysler | Jan. 1, 1918 |
| 1,304,736 | Browning | May 27, 1919 |
| 1,553,942 | Kennedy | Sept. 15, 1925 |
| 1,859,641 | Weaver | May 24, 1932 |
| 2,042,456 | Cain | June 2, 1936 |